(12) United States Patent
Yamashita

(10) Patent No.: US 7,184,211 B2
(45) Date of Patent: Feb. 27, 2007

(54) TRANSMISSIVE SCREEN AND REAR-PROJECTION DISPLAY DEVICE

(75) Inventor: Hideto Yamashita, Suwa (JP)

(73) Assignee: Seiko Epson Corporation (JP)

( * ) Notice: Subject to any disclaimer, the term of this patent is extended or adjusted under 35 U.S.C. 154(b) by 162 days.

(21) Appl. No.: 10/988,420

(22) Filed: Nov. 12, 2004

(65) Prior Publication Data

US 2006/0001964 A1    Jan. 5, 2006

(30) Foreign Application Priority Data

Nov. 18, 2003    (JP)    .............................. 2003-388172

(51) Int. Cl.
G03B 24/60    (2006.01)
(52) U.S. Cl. ...................................... 359/457; 359/460
(58) Field of Classification Search ........ 359/454–457, 359/460
See application file for complete search history.

(56) References Cited

U.S. PATENT DOCUMENTS 6,249,376 B1    6/2001    Goto
6,552,848 B2 *  4/2003    Kobayashi .................. 359/457

FOREIGN PATENT DOCUMENTS

| JP | 2922233 B | 7/1991 |
|---|---|---|
| JP | 09-015729 | 1/1997 |
| JP | 11-038513 | 2/1999 |
| JP | 2922233 | 4/1999 |
| JP | 11-202416 | 7/1999 |
| JP | 2002-090889 | 3/2000 |
| JP | 2000-171904 | 6/2000 |
| JP | 2003-121609 | 4/2003 |
| JP | 2003-280106 | 10/2003 |
| JP | 2004-045587 | 2/2004 |
| JP | 2004-093933 | 3/2004 |
| JP | 3607303 | 10/2004 |

* cited by examiner

*Primary Examiner*—Diane Lee
*Assistant Examiner*—Robert C. Do
(74) *Attorney, Agent, or Firm*—Harness, Dickey & Pierce, P.L.C.

(57) ABSTRACT

A transmissive screen is provided that controls moire pattern occurrence to prevent the degradation of image quality. The transmissive screen includes a Fresnel lens sheet having a Fresnel lens unit and a microlens array sheet having a microlens unit that are placed opposite to each other. Projected images enter from one side of the screen and are displayed on the other side of the screen, assuming that the lens pitch on one side of the microlens unit is P, the lens pitch of the Fresnel lens unit is Pf, and the pixel-frame pitch projected on the screen is Pb, the following expressions are satisfied: $P \neq Pb \cdot Pf/(Pb+Pf)$; $P \neq Pb \cdot Pf/2 \times (Pb+Pf)$; and $P \neq Pb \cdot Pf/2 \times (Pb-Pf)$.

4 Claims, 2 Drawing Sheets

TRANSMISSIVE SCREEN AND REAR-PROJECTION DISPLAY DEVICE

RELATED APPLICATION

This application claims priority to Japanese Patent Application No. 2003-388172 filed Nov. 18, 2003, which is hereby expressly incorporated by reference herein in its entirety.

BACKGROUND

1. Field of the Invention

The present invention relates to a transmissive screen and a rear-projection display device having the transmissive screen.

2. Related Art

Currently, rear-projection display devices in which projected images enter from the rear of a screen and are displayed on the front of the screen are widely used as rear projectors or the like. Rear-projection display devices have an advantage of obtaining clear images even in a bright ambient environment. Such rear-projection display devices usually have, as a projection device, a built-in liquid crystal projector using a liquid crystal panel, and further, as a display screen, a transmissive screen comprising a plurality of lens sheets combined according to need. Conventionally, this type of transmissive screen is configured by combining a Fresnel lens sheet, a lenticular lens sheet, a prism lens sheet, a diffusion sheet, etc. A combination of a Fresnel lens sheet and a lenticular lens sheet is widely employed in view of advantages such as a bright screen surface and a wide viewing angle.

However, since liquid crystal projectors project images by emitting a light source through a liquid crystal panel having segments divided according to pixel frames, there has been a problem of interference occurring between the shades of pixel frames and a striped pattern formed in concentric circles of the Fresnel lens or a vertical striped pattern of the lenticular lens, causing noticeable moire patterns which degrade image quality. To improve such a problematic situation, there is a known solution to adjust the pitch amounts between the pixel-frame pitch of an image projected by the liquid crystal projector and the lens pitch of the Fresnel lens sheet, and also between the projected pixel-frame pitch and the lens pitch of the lenticular lens sheet at a specific range (refer to Japanese Patent Gazette No. 2922233).

In the case of applying the above solution to the microlens array sheet, moire patterns occurring between the projected pixel frames and the Fresnel lens sheet and between the projected pixel frames and the microlens array sheet have been improved. However, in the conventional technique, a moire pattern between the Fresnel lens sheet and the microlens array sheet further causes another moire pattern in conjunction with the projected pixel frames, leaving a degraded image quality.

The purpose of the present invention is to solve such a problem and provide a transmissive screen which does not degrade image quality and a rear-projection display device with the transmissive screen by controlling moire patterns when images are projected from a projection device such as a liquid crystal projector.

SUMMARY

The transmissive screen according to the present invention is a screen which comprises a Fresnel lens sheet with a Fresnel lens unit having a plurality of lenses formed at constant pitches and a microlens array sheet with a microlens unit having a plurality of lenses formed at constant pitches, both of which are placed opposite to each other. Further, the transmissive screen in which projected images enter from one side of the screen to be projected on the other side, with an assumption that the lens pitch on one side of the microlens unit is P; the lens pitch of the Fresnel lens unit is Pf; and the projected pixel-frame pitch of an image to be projected on the screen is Pb, satisfies the conditions that: the lens pitch P on one side of the microlens unit is 0.8 to 0.55 times, 0.45 to 0.36 times, or 0.3 times or less the lens pitch Pf of the Fresnel lens unit; the lens pitch P on one side of the microlens unit is 0.8 to 0.55 times, 0.45 to 0.36 times, or 0.3 times or less the pixel-frame pitch Pb; and the lens pitch Pf of the Fresnel lens unit is 0.8 to 0.55 times, 0.45 to 0.36 times, or 0.3 times or less the pixel-frame pitch Pb, and moreover satisfies expressions:

$$P \neq Pb \cdot Pf/(Pb+Pf);$$

$$P \neq Pb \cdot Pf/2 \times (Pb+Pf);\text{ and}$$

$$P \neq Pb \cdot Pf/2 \times (Pb-Pf).$$

With this screen, a moire pattern occurring among the microlens array sheet, the Fresnel lens sheet, and the pixel frames projected on the screen, and another moire pattern caused by a moire pattern between the Fresnel lens sheet and the microlens array sheet in conjunction with the pixel frames can be controlled and quality images with less-noticeable moire patterns can be displayed.

Further, in the above screen, all of the following (a), (b) and (c) are satisfied:

(a) $P \leq 0.9 \times Pb \cdot Pf/(Pb+Pf)$ or $P \geq 1.1 \times Pb \cdot Pf/(Pb+Pf)$;
(b) $P \leq 0.95 \times Pb \cdot Pf/2 \times (Pb+Pf)$ or $P \geq 1.05 \times Pb \cdot Pf/2 \times (Pb+Pf)$; and
(c) $P \leq 0.95 \times Pb \cdot Pf/2 \times (Pb-Pf)$ or $P \geq 1.05 \times Pb \cdot Pf/2 \times (Pb-Pf)$.

With this screen, the moire pattern among the microlens array sheet, the Fresnel lens sheet, and the pixel frames projected on the screen, and the moire pattern caused by a moire pattern between the Fresnel lens sheet and the microlens array sheet in conjunction with a moire pattern caused by the pixel frames can be further controlled and quality images with barely-noticeable moire patterns can be displayed.

The rear-projection display device according to the present invention, equipped with the transmissive screen and the projection device described in any of the above paragraphs, displays projected images by projecting images from the projection device and letting them enter from the back of the transmissive screen to display them on the front of the screen. Thus, a rear-projection display device displaying quality images can be obtained, making moire patterns virtually non-problematic.

DETAILED DESCRIPTION

Figure 1:
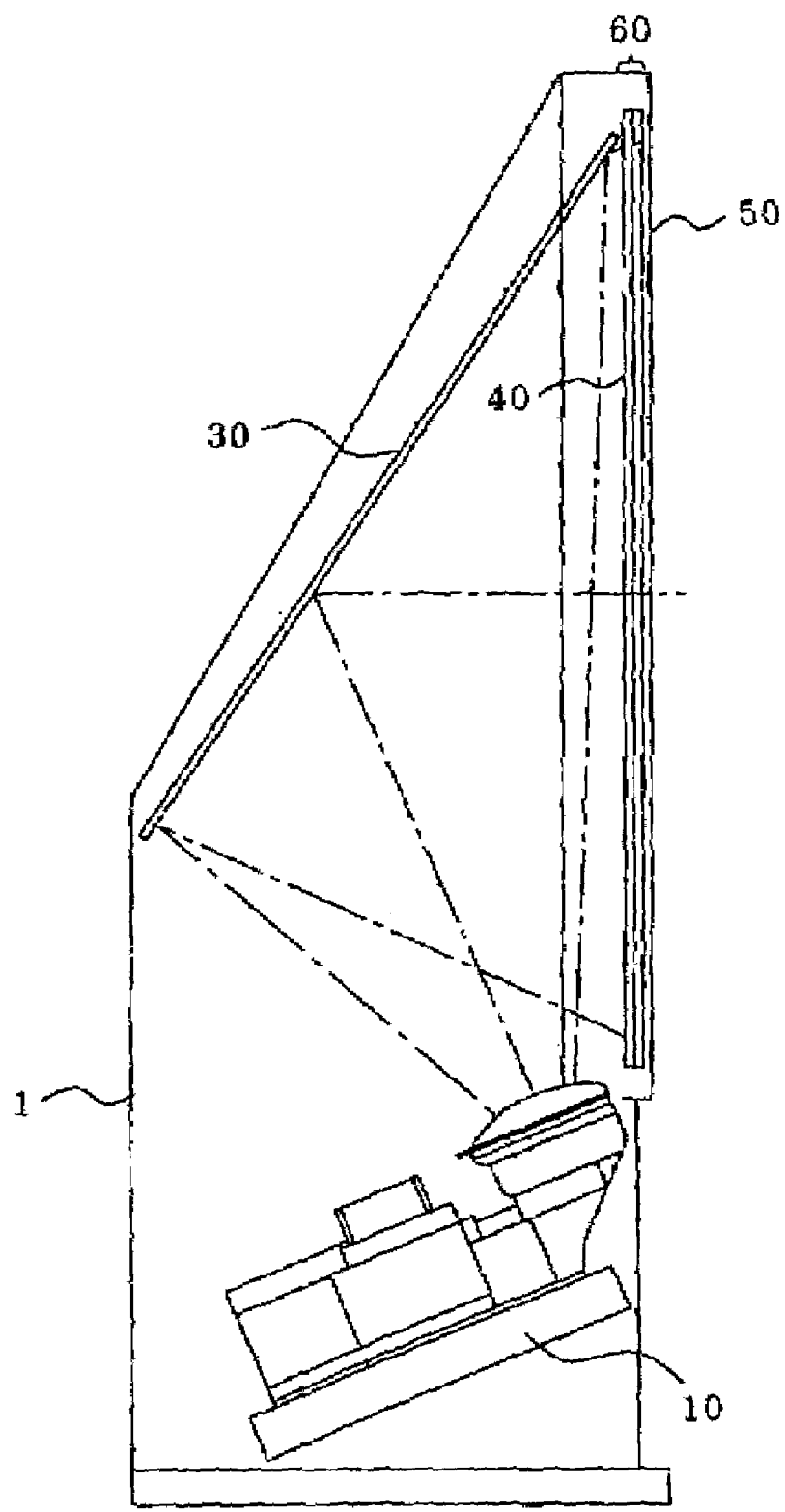
FIG. 1 is a schematic drawing of a rear-projection display device related to the embodiment of the present invention.
Figure 2:
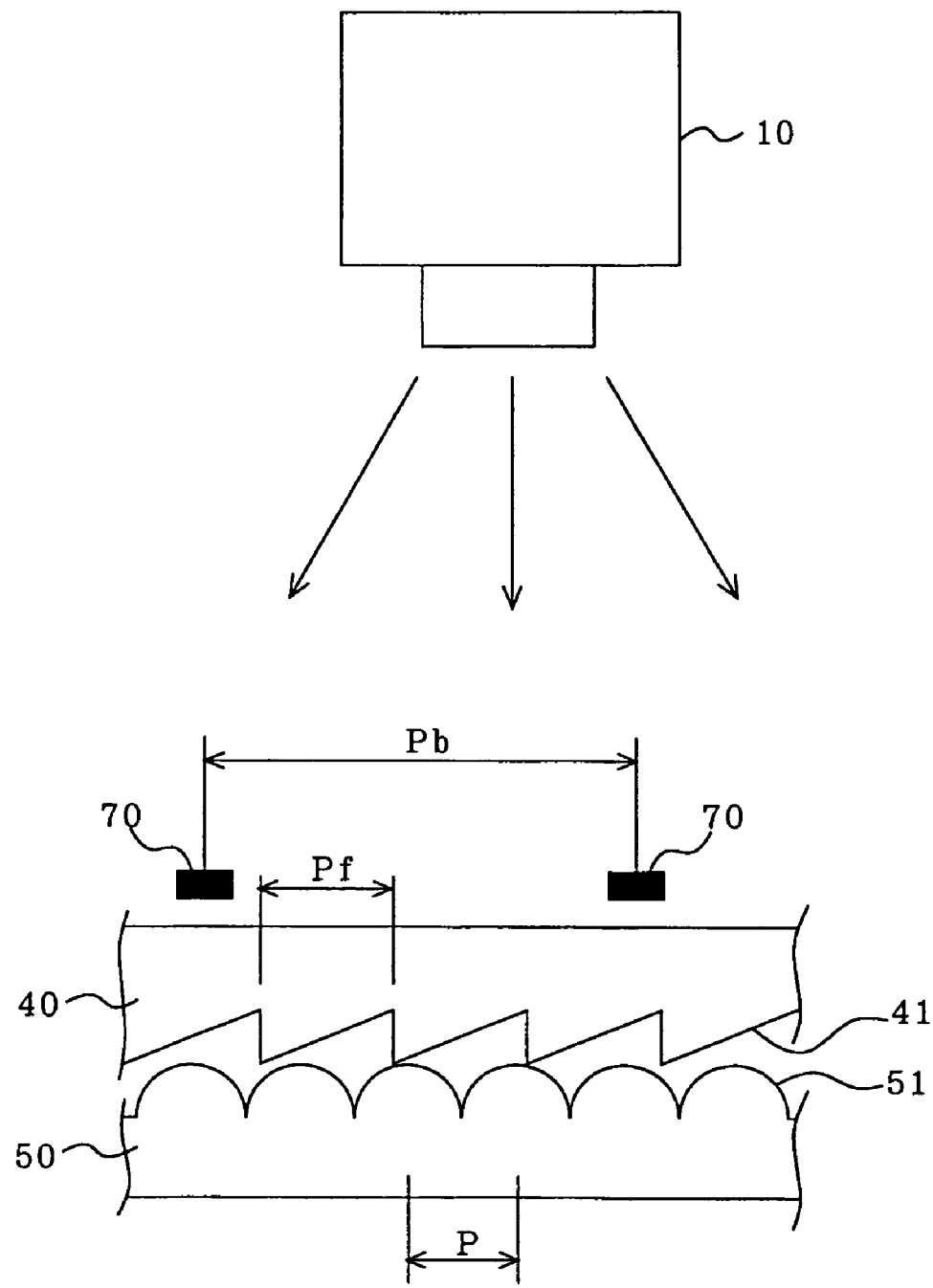
FIG. 2 is a schematic drawing describing a transmissive screen related to the embodiment of the present invention.

FIG. 1 is a configuration drawing of the rear-projection display device related to the embodiment of the present invention. FIG. 2 is a schematic drawing of the transmissive screen related to the embodiment of the present invention. A rear-projection display device 1 is equipped with a projection optical unit 10, a mirror 30 for adjusting the path of light projected from the projection optical unit 10, and a transmissive screen 60 for displaying an image on the front of the screen by allowing the projected light to enter from the back.

The projection optical unit 10, having a built-in liquid crystal panel (not illustrated), projects images formed on the liquid crystal panel to the transmissive screen 60 using an illumination from a light source.

The transmissive screen 60 comprises a Fresnel lens sheet 40 with a Fresnel lens unit 41 having a number of jagged lenses formed at constant pitches Pf and a microlens array sheet 50 with a microlens unit 51 having a number of spherical lenses (microlenses) formed at constant pitches P. In this configuration, the lens units 41 and 51 are placed opposite to each other, wherein the Fresnel lens sheet 40 is placed on the side of the projection optical unit 10, and the microlens array sheet 50 on the side of viewers.

In the case of the rear-projection display device with the above configuration, moire patterns may occur due to the relationships between projected pixel frames 70 formed by the projection of pixel frames of the liquid crystal panel and the Fresnel lens unit 41 of the Fresnel lens sheet 40, between the projected pixel frames 70 and the microlens unit 51 of the microlens array sheet 50, and also between the Fresnel lens unit 41 of the Fresnel lens sheet 40 and the microlens unit 51 of the microlens array sheet 50. Further, there may be another moire pattern caused by the moire pattern due to the relationship between the Fresnel lens unit 41 and the microlens unit 51 in conjunction with the projected pixel frames 70. Here, as shown in FIG. 2, the lens pitch of the Fresnel lens unit 41 is assumed to be Pf, the lens pitch of the microlens unit 51 in the direction corresponding to that of the lens pitch Pf of the Fresnel lens unit 41 to be P, and the pitch of the projected pixel frames 70 to be Pb.

Now, the following facts are now acknowledged regarding moire patterns.

(1) The closer to an integral multiple the pitch ratio of respective related objects becomes, the more noticeable moire patterns become. For example, when the projected pixel-frame pitch and the lens-unit pitch are equal, a noticeable large-cycle moire pattern occurs. Therefore, when the ratio of the two pitches is 2 to 1, 3 to 1, or the like, a large-cycle moire pattern is predicted to occur. Further, the more the relationship between the two pitches deviates from n times or 1/n times (n is an integer), the less noticeable moire patterns become. Also, as the n for the n times or 1/n times becomes larger, the density of moire patterns becomes lower. When the n reaches 4 or more, moire patterns are virtually non-problematic.

(2) The moire-pattern pitch is the reciprocal of the remainder obtained by subtracting the respective reciprocals (spatial frequency) of the pitches of related objects. That is, the pitch of the moire pattern between the Fresnel lens unit 41 with the pitch Pf and the microlens unit 51 with the pitch P (hereinafter referred to as the moire pattern between lens units) is given by:

$$1/|1/m \cdot Pf - 1/n \cdot P| = m \cdot n \cdot Pf \cdot P / n \cdot P - m \cdot Pf.$$

Here, m and n are integers.

Further, the moire pattern caused by the moire pattern between lens units in conjunction with the projected pixel frames 70 occurs more easily when the pitch of the moire pattern between lens units is equal to the pitch Pb of the projected pixel frames 70, which is given by:

$$m \cdot n \cdot Pf \cdot P / n \cdot P - m \cdot Pf = Pb.$$

When this equation is solved for P, the following can be obtained:

when $n \cdot P - m \cdot Pf$ is positive, $P = Pb \cdot Pf / n \cdot (Pb - Pf)$; and when $n \cdot P - m \cdot Pf$ is negative, $P = Pb \cdot Pf / n \cdot (Pb + Pf) P - b$.

However, there is no assumption of actually creating a microlens unit having a lens pitch larger than that of the Fresnel lens unit, and therefore m can be fixed to 1. Further, for the moire pattern caused by the moire pattern between lens units in conjunction with the projected pixel frames 70, only the case where n is 1 or 2 should be considered because moire patterns become less noticeable as n becomes larger.

From the viewpoint of (1) above, it is preferable to assume as condition 1 that:

the lens pitch P on one side of the microlens unit 51 is 0.8 to 0.55 times, 0.45 to 0.36 times, or 0.3 times or less the lens pitch Pf of the Fresnel lens unit 41;

the lens pitch P on one side of the microlens unit 51 is 0.8 to 0.55 times, 0.45 to 0.36 times, or 0.3 times or less the pitch Pb of the projected pixel frames 70; and further the lens pitch Pf of the Fresnel lens unit 41 is 0.8 to 0.55 times, 0.45 to 0.36 times, or 0.3 times or less the pitch Pb of the projected pixel frames 70.

In addition, from the viewpoint of (2) above, by assuming as condition 2 that:

$$P \neq Pb \cdot Pf/(Pb+Pf);$$

$$P \neq Pb \cdot Pf/2 \times (Pb+Pf); \text{ and}$$

$$P \neq Pb \cdot Pf/2 \times (Pb-Pf),$$

the moire pattern caused by the moire pattern between lens units in conjunction with the projected pixel frames 70 can be made less noticeable.

Further by assuming as condition 3 that:

(a) $P \leq 0.9 \times Pb \cdot Pf/(Pb+Pf)$ or $P \geq 1.1 \times Pb \cdot Pf/(Pb+Pf)$;

(b) $P \leq 0.95 \times Pb \cdot Pf/2 \times (Pb+Pf)$ or $P \geq 1.05 \times Pb \cdot Pf/2 \times (Pb+Pf)$; and (c) $P \leq 0.95 \times Pb \cdot Pf/2 \times (Pb-Pf)$ or $P \geq 1.05 \times Pb \cdot Pf/2 \times (Pb-Pf)$, the moire pattern caused by the moire pattern between lens units in conjunction with the projected pixel frames 70 can be made barely noticeable.

Embodiment

Assuming the lens pitch Pf of the Fresnel lens unit 41 is 112 μm and the pitch Pb of the projected pixel frames 70, which attribute to pixel frames of the liquid crystal panel, are 400 μm, 600 μm and 800 μm, respectively, an experiment regarding moire pattern conditions was implemented by projecting a projection light from a liquid crystal projector to the transmissive screen 60 configured by varying the lens pitch P on one side of the microlens unit 51 at 5 μm pitches within a range of 40 μm to 90 μm. The result is summarized in Table 1 below.

TABLE 1

| Lens pitch of microlens array: μm | Pixel-frame pitch: 400 μm | Pixel-frame pitch: 600 μm | Pixel-frame pitch: 800 μm |
|---|---|---|---|
| 90 | × | × | × |
| 85 | × | × | Δ |
| 80 | × | ○ | ○ |
| 75 | × | Δ | ⊚ |
| 70 | Δ | × | ○ |
| 65 | ○ | Δ | × |
| 60 | × | × | × |
| 55 | × | × | × |
| 50 | Δ | Δ | × |
| 45 | × | × | Δ |
| 40 | × | × | × |

Note 1. Lens pitch of Fresnel lens: 112 μm
Note 2. Explanation of symbols
⊚: Very good;
○: Good;
Δ: Practically non-problematic;
×: Not allowed (Practically problematic)

With the combinations indicated by symbols ⊚, ○ and Δ in Table 1, moire patterns never become noticeable and the quality of displayed images are preferable or practically not problematic. These combinations satisfy condition 1 and condition 2, or condition 1 and condition 3 described above.

Whereas, with the combinations indicated by × in Table 1, moire patterns become noticeable and the quality of the displayed images are too degraded to be employed in practical use. These combinations do not satisfy condition 1 or condition 2.

FIELD OF INDUSTRIAL APPLICATION

The transmissive screen according to the present invention is applicable for various rear-projection display devices such as televisions, recreational machines, etc. that project images from the rear side of the screen and display such images on the front side of the screen.

In addition, the projection devices used for such rear-projection display devices are not necessarily limited to liquid crystal projectors, and projection devices using other devices are acceptable.

What is claimed is:

1. A transmissive screen, comprising:
   a Fresnel lens sheet with a Fresnel lens unit having a plurality of lenses formed at constant pitches; and
   a microlens array sheet with a microlens unit having a plurality of lenses formed at constant pitches,
   wherein the Fresnel lens sheet and the microlens array sheet are placed opposite to each other and projected images enter from one side of the screen to be projected on the other side, and further, assuming that a lens pitch on one side of the microlens unit is P; a lens pitch of the Fresnel lens unit is Pf; and a projected pixel-frame pitch of an image to be projected on the screen is Pb, the following conditions are satisfied:
   the lens pitch P on one side of the microlens unit is at least one of 0.8 to 0.55 times, 0.45 to 0.36 times, and 0.3 times or less than the lens pitch Pf of the Fresnel lens unit;
   the lens pitch P on one side of the microlens unit is at least one of 0.8 to 0.55 times, 0.45 to 0.36 times, and 0.3 times or less than the pixel-frame pitch Pb; and
   the lens pitch Pf of the Fresnel lens unit is at least one of 0.8 to 0.55 times, 0.45 to 0.36 times, and 0.3 times or less than the pixel-frame pitch Pb,
   and the following expressions are satisfied:

$P \neq Pb \cdot Pf/(Pb+Pf)$;

$P \neq Pb \cdot Pf/2 \times (Pb+Pf)$; and $P \neq Pb \cdot Pf/2 \times (Pb-Pf)$.

2. The transmissive screen according to claim 1, wherein all of the following expressions are satisfied:
   (a) at least one of $P \leq 0.9 \times Pb \cdot Pf/(Pb+Pf)$ and $P \geq 1.1 \times Pb \cdot Pf/(Pb+Pf)$;
   (b) at least one of $P \leq 0.95 \times Pb \cdot Pf/2 \times (Pb+Pf)$ and $P \geq 1.05 \times Pb \cdot Pf/2 \times (Pb+Pf)$; and
   (c) at least one of $P \leq 0.95 \times Pb \cdot Pf/2 \times (Pb-Pf)$ and $P \geq 1.05 \times Pb \cdot Pf/2 \times (Pb-Pf)$.

3. A rear-projection display device having the transmissive screen according to claim 2 and a projection device, wherein images projected by the projection device enter from a rear of the transmissive screen and are displayed on a front of the screen.

4. A rear-projection display device having the transmissive screen according to claim 1 and a projection device, wherein images projected by the projection device enter from a rear of the transmissive screen and are displayed on a front of the screen.

* * * * *